(12) United States Patent
Dirksen et al.

(10) Patent No.: US 9,658,359 B2
(45) Date of Patent: May 23, 2017

(54) NMR TRACKING OF INJECTED FLUIDS

(75) Inventors: Ron Dirksen, Spring, TX (US);
Songhua Chen, Katy, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 691 days.

(21) Appl. No.: 14/131,815

(22) PCT Filed: Jul. 12, 2011

(86) PCT No.: PCT/US2011/043678
§ 371 (c)(1),
(2), (4) Date: Jan. 9, 2014

(87) PCT Pub. No.: WO2013/009299
PCT Pub. Date: Jan. 17, 2013

(65) Prior Publication Data
US 2014/0145716 A1 May 29, 2014

(51) Int. Cl.
*G01V 3/00* (2006.01)
*G01V 3/32* (2006.01)
*E21B 43/26* (2006.01)
*E21B 49/00* (2006.01)

(52) U.S. Cl.
CPC ............... *G01V 3/32* (2013.01); *E21B 43/26* (2013.01); *E21B 49/008* (2013.01)

(58) Field of Classification Search
CPC .......... G01V 3/32; E21B 43/26; E21B 49/008
USPC ........................................................ 324/303
See application file for complete search history.

(56) References Cited

U.S. PATENT DOCUMENTS

| 2,303,090 | A | 11/1942 | Pranger et al. |
| 3,648,777 | A | 3/1972 | Arterbury et al. |
| 3,657,730 | A | 4/1972 | Robinson et al. |
| 4,047,569 | A | 9/1977 | Tagirov et al. |
| 4,350,955 | A | 9/1982 | Jackson et al. |

(Continued)

FOREIGN PATENT DOCUMENTS

| WO | WO-2011/038170 | 3/2011 |
| WO | WO-2011/044012 | 4/2011 |
| WO | WO-2013/009299 | 1/2013 |

OTHER PUBLICATIONS

Hou et al., Nuclear Magnetic Resonance Logging Methods for Fluid Typing, 1998, Society of Petroleum Engineers, Inc.*

(Continued)

*Primary Examiner* — Susan Lee
(74) *Attorney, Agent, or Firm* — Iselin Law PLLC; Alan Bryson

(57) ABSTRACT

Formation testing systems and methods may inject fluids into a formation to initiate fractures and facilitate measurements of various formation properties. In accordance with certain disclosed embodiments, the injection tools are further provided with nuclear magnetic resonance (NMR) sensors to monitor the injected fluids and provide measurements of near-borehole fracture orientations and volumes. Contrast agents and/or magnetic resonance imaging (MRI) techniques may be employed. The fluid injection may occur via an extendible isolation pad, via a fracturing jet, or via an injection port in an isolated region of the borehole. The systems may employ pressure monitoring in conjunction with the NMR sensors to further enhance estimates of formation and fracture properties.

22 Claims, 4 Drawing Sheets

(56) References Cited

U.S. PATENT DOCUMENTS

| | | | |
|---|---|---|---|
| 6,069,477 A | 5/2000 | Chen et al. | |
| 6,084,408 A | 7/2000 | Chen et al. | |
| 6,225,803 B1 | 5/2001 | Chen | |
| 6,331,775 B1 | 12/2001 | Thern et al. | |
| 6,388,441 B1 | 5/2002 | Chen | |
| 6,392,409 B1 | 5/2002 | Chen et al. | |
| 6,400,148 B1 | 6/2002 | Meyer et al. | |
| 6,597,170 B1 | 7/2003 | Beard et al. | |
| 6,600,316 B2 | 7/2003 | Chen et al. | |
| 6,603,310 B2 | 8/2003 | Georgi et al. | |
| 6,755,246 B2 | 6/2004 | Chen et al. | |
| 6,825,658 B2* | 11/2004 | Coates | G01N 24/081 324/300 |
| 6,828,892 B1 | 12/2004 | Fukushima et al. | |
| 6,859,034 B2 | 2/2005 | Chen | |
| 6,972,564 B2 | 12/2005 | Chen et al. | |
| 7,227,355 B2 | 6/2007 | Chen et al. | |
| 7,234,542 B2 | 6/2007 | Vail | |
| 7,253,617 B1 | 8/2007 | Chen et al. | |
| 7,257,490 B2 | 8/2007 | Georgi et al. | |
| 7,298,142 B2 | 11/2007 | Hursan et al. | |
| 7,301,338 B2 | 11/2007 | Gillen et al. | |
| 7,356,413 B2 | 4/2008 | Georgi et al. | |
| 7,363,161 B2 | 4/2008 | Georgi et al. | |
| 7,425,827 B2 | 9/2008 | Chen et al. | |
| 7,502,692 B2 | 3/2009 | Chen | |
| 7,565,246 B2 | 7/2009 | Fang et al. | |
| 7,565,833 B2 | 7/2009 | Gillen et al. | |
| 7,584,655 B2 | 9/2009 | Van Zuilekom et al. | |
| 7,753,119 B2 | 7/2010 | Chen et al. | |
| 7,768,260 B2 | 8/2010 | Chen et al. | |
| 7,808,238 B2 | 10/2010 | Chen | |
| 7,825,659 B2 | 11/2010 | Georgi et al. | |
| 8,297,354 B2* | 10/2012 | Ayan | G01V 3/32 166/250.15 |
| 2004/0084189 A1 | 5/2004 | Hosie et al. | |
| 2004/0118613 A1 | 6/2004 | Vail, III | |
| 2005/0017723 A1* | 1/2005 | Entov | G01V 3/26 324/346 |
| 2008/0045865 A1 | 2/2008 | Kislev | |
| 2008/0202755 A1 | 8/2008 | Henke et al. | |
| 2008/0264690 A1 | 10/2008 | Khan et al. | |
| 2009/0179636 A1 | 7/2009 | Chen | |
| 2009/0179649 A1* | 7/2009 | Schmidt | G01V 3/26 324/345 |
| 2009/0188666 A1* | 7/2009 | Habib | E21B 17/00 166/250.01 |
| 2009/0288820 A1* | 11/2009 | Barron | B01J 13/02 166/249 |
| 2009/0288881 A1* | 11/2009 | Mullins | E21B 7/04 175/50 |
| 2010/0089142 A1* | 4/2010 | Sukhija | C09K 8/58 73/152.39 |
| 2010/0126717 A1 | 5/2010 | Kuchuk et al. | |
| 2010/0155058 A1* | 6/2010 | Gordy | E21B 47/101 166/250.1 |
| 2010/0245121 A1* | 9/2010 | Reed | E21B 47/18 340/855.4 |
| 2010/0264915 A1 | 10/2010 | Saldungaray et al. | |
| 2010/0286918 A1 | 11/2010 | Moos et al. | |
| 2011/0181278 A1* | 7/2011 | Chen | G01V 3/32 324/303 |
| 2012/0043459 A1* | 2/2012 | Hill | G01V 5/101 250/269.4 |
| 2012/0273192 A1* | 11/2012 | Schmidt | E21B 47/122 166/250.1 |

OTHER PUBLICATIONS

PCT International Search Report and Written Opinion, dated Dec. 1, 2010, Appl No. PCT/US10/51264, "Single-Assembly System and Method for One-Trip Drilling, Casing, Cementing, and Perforating", filed Oct. 4, 2010, 8 pgs.

PCT International Search Report and Written Opinion, dated Nov. 2, 2011, Appl No. PCT/US2011/043678, "NMR Tracking of Injected Fluids," filed Jul. 12, 2011, 8 pgs.

PCT International Preliminary Report on Patentability, dated Apr. 9, 2012, Appl No. PCT/US2010/051264, "Single-Assembly System and Method for One-Trip Drilling, Casing, Cementing, and Perforating", filed Oct. 4, 2010, 7 pgs.

PCT International Preliminary Report on Patentability, dated Nov. 2, 2011, Appl No. PCT/US2011/043678, "NMR Tracking of Injected Fluids," filed Jul. 12, 2011, 19 pgs.

* cited by examiner

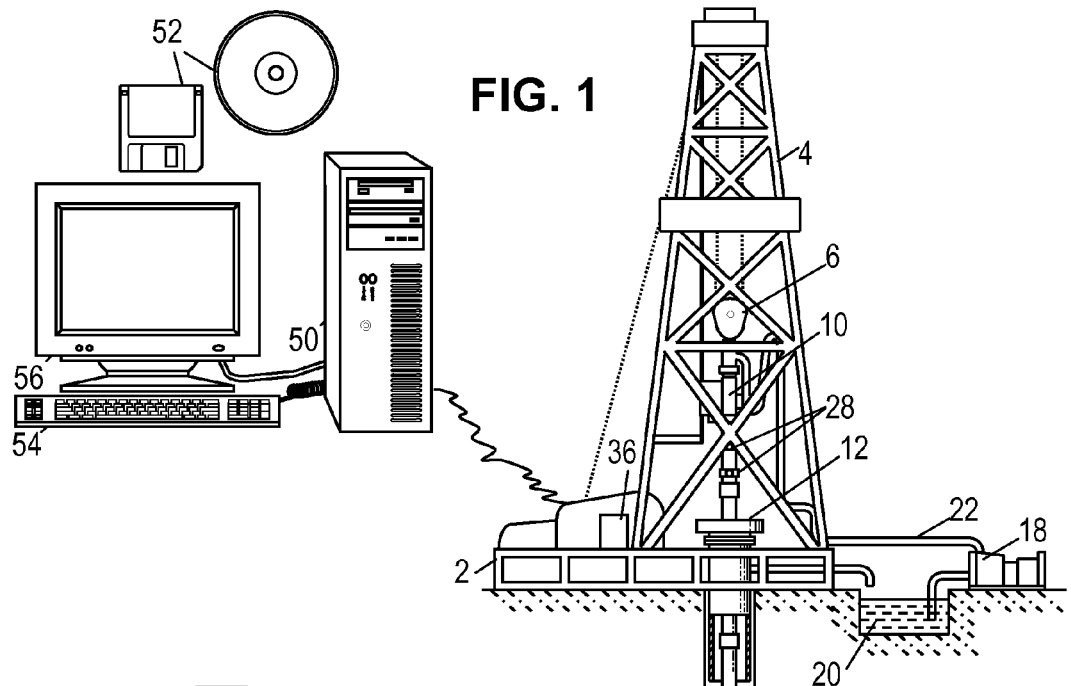
FIG. 1
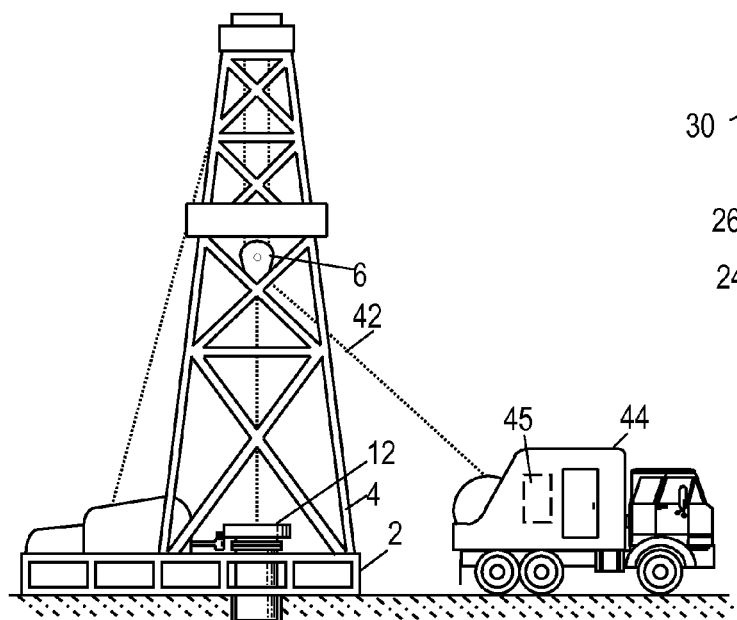
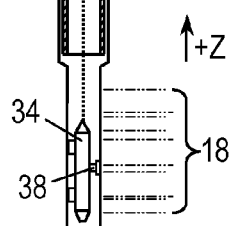
FIG. 2

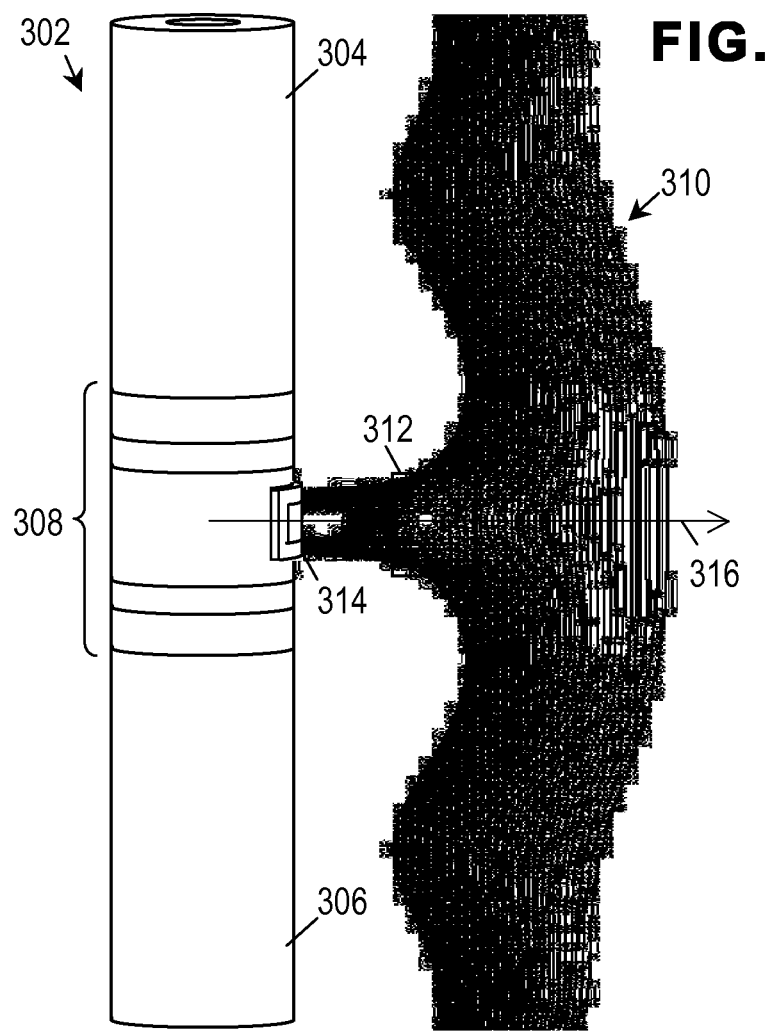
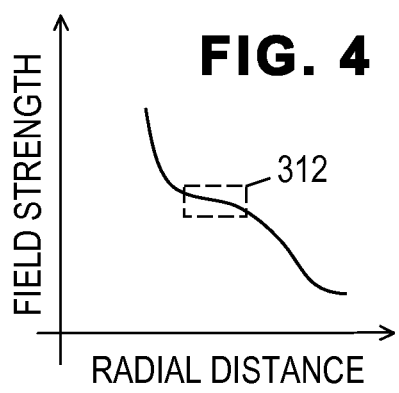
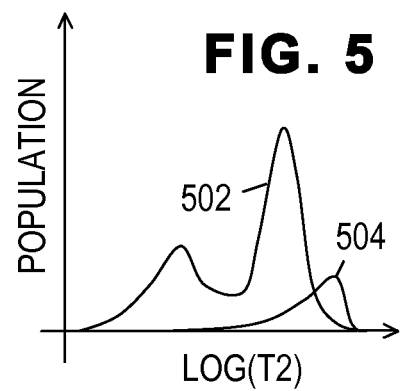

NMR TRACKING OF INJECTED FLUIDS

BACKGROUND

Oil field operators demand access to a great quantity of information regarding the parameters and conditions encountered downhole. Such information includes characteristics of the earth formations traversed by the borehole and/or data relating to the size and configuration of the borehole itself. The measured parameters are usually recorded and displayed in the form of a log, i.e., a graph showing the measured parameter as a function of tool position or depth. The collection of information relating to conditions downhole is commonly referred to as "logging".

Many types of downhole tools exist. One available type of downhole tool is a nuclear magnetic resonance (NMR) logging tool. NMR tools operate by using an imposed static magnetic field, $B_0$, to preferentially align certain nuclei and thereby produce a bulk magnetization. After a change in the static field, the nuclei converge upon their equilibrium alignment with a characteristic exponential relaxation time constant known as the "spin-lattice" or "longitudinal" relaxation time $T_1$. Another relaxation time constant that can be measured is the "spin-spin" or "transverse" relaxation time $T_2$. The tool applies a radio frequency electromagnetic pulse whose magnetic component, $B_1$, is perpendicular to the static field $B_0$. This pulse tips the nuclei's magnetic orientation into the transverse (perpendicular) plane and, once the pulse ends, causes them to precess ("spin") in the transverse plane as they realign themselves with the static field. The $T_2$ relaxation time constant represents how quickly the transverse plane magnetization disperses through de-phasing and magnitude loss. The precessing nuclei generate a detectable radio frequency signal that can be used to measure statistical distributions of $T_1$ and $T_2$, from which other formation properties such as porosity, permeability, and hydrocarbon saturation can be determined. To enhance the measurement accuracy of the relaxation times, the tool can provide a sequence of radio frequency pulses (such as the well-known Carr-Purcell-Meiboom-Gill "CPMG" pulse sequence) to invert the spin phase and cause the dispersed transverse plane magnetization to gradually refocus into phase, thereby inducing a series of "spin echo" signals. If an NMR tool collects measurements as a function of three spatial dimensions, it is usually called a magnetic resonance imaging (MRI) tool.

Another available downhole tool is a formation tester. Formation testers isolate a portion of the borehole wall, either with an isolation pad or a configuration of one or more inflatable packers. The isolated portion of the borehole wall is optionally "cleaned" and then subjected to a pressure test. The pressure test may include a suction phase in which some volume in front of the isolated borehole wall region is first evacuated and then allowed to fill with fluid from the formation. The fluid sample, together with the pressure-versus-time profile, reveals a great deal of information about formation permeability, fluid type, fluid quality, formation pressure, formation temperature, bubblepoint, and (for multiple measurements) the formation pressure gradient. The pressure test may additionally or alternatively include an injection phase in which the volume in front of the isolated borehole wall region is pressurized to inject a test fluid into the formation. The injection test can be conducted in a variety of ways. For example, the volume may be pressurized to a given pressure and then allowed to equilibrate. Alternatively, the tool may continually increase the pressure until the formation fractures and a certain quantity of fluid has been injected. As yet another option, the tool may attempt to inject a given amount of fluid within a given amount of time. In any event, the pressure-versus-time profile is monitored to determine properties such as formation permeability, fracture initiation pressure, and formation pressure.

Despite the availability of the tools described above and many others, there yet remains a number of formation properties that cannot be measured in situ by any existing tool. For example, the authors are unaware of any tools that can measure the manner in which formation fractures are initiated and propagated, or which can measure the movement of fluids within a newly formed fracture to provide a real-time indication of fracture volume and orientation.

DESCRIPTION OF THE DRAWINGS

A better understanding of the various disclosed embodiments can be obtained when the following detailed description is considered in conjunction with the attached drawings, in which:

FIG. 1 shows an illustrative environment for logging while drilling ("LWD");

FIG. 2 shows an illustrative environment for wireline logging;

FIG. 3 shows an illustrative nuclear magnetic resonance ("NMR") tool configuration;

FIG. 4 shows an illustrative radial dependence of a static field;

FIG. 5 shows two illustrative $T_2$ distributions;

Figure 6A:
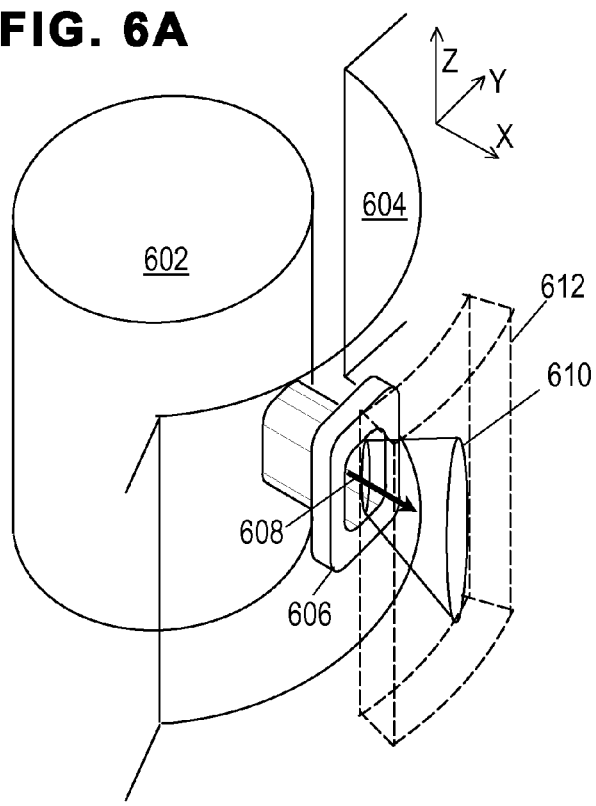
FIGS. 6a-6c show illustrative tools initiating fractures relative to a sensing region.

It should be understood that the drawings and detailed description thereto do not limit the disclosure to the particular illustrated embodiments, but on the contrary, the illustrated embodiments provide a foundation for understanding all modifications, equivalents and alternatives falling within the scope of the disclosure and appended claims.

DETAILED DESCRIPTION

The issues identified in the background are at least in part addressed by systems and methods that provide nuclear magnetic resonance (NMR) tracking of injected fluids. In accordance with certain disclosed embodiments, the injection tools are provided with nuclear magnetic resonance (NMR) sensors to monitor fluids during the injection process and provide real-time measurements of near-borehole fracture orientations and volumes. Contrast agents and/or magnetic resonance imaging (MRI) techniques may be employed. The fluid injection may occur via an extendible isolation pad, via a fracturing jet, or via an injection port in an isolated region of the borehole. The systems may employ pressure monitoring in conjunction with the NMR sensors to further enhance estimates of formation and fracture properties.

The disclosed systems and methods are best understood in the context of the environment in which they operate. Accordingly, FIG. 1 shows an illustrative logging while drilling (LWD) environment. A drilling platform 2 supports a derrick 4 having a traveling block 6 for raising and lowering a drill string 8. A top drive 10 supports and rotates the drill string 8 as the string is lowered through a well head 12. The drill string's rotation (and/or a downhole motor) drives a drill bit 14 to extend the borehole 16. Mud recirculation equipment 18 draws drilling fluid from a retention pit 20 and pumps it through a feed pipe 22 to top drive 10, through the interior of drill string 8 to the drill bit 14, through orifices in drill bit, through the annulus around drill string 8 to a blowout preventer at the surface, and through a discharge pipe into the pit 20. The drilling fluid transports cuttings from the borehole into the pit 20 and aids in maintaining the borehole integrity.

An NMR tool 24 is integrated into the bottom-hole assembly ("BHA") near the bit 14. As the bit extends the borehole through the formations, the NMR tool 24 collects measurements relating to spin relaxation time distributions as a function of depth or position in the borehole. As described further below, the tool 24 may be equipped with a fluid injection port or a fracturing jet configured to induce a formation fracture in or near the NMR tool's sensing region. A probe with an extendible isolation pad or inflatable packer(s) 25 can be included to isolate a region of the borehole wall and reduce the energy required to initiate a formation fracture. Other tools and sensors can also be included in the bottomhole assembly to gather measurements of various drilling parameters such as BHA position, orientation, weight-on-bit, borehole diameter, etc. Control/telemetry module 26 collects data from the various bottom-hole assembly instruments (including position and orientation information) and stores them in internal memory. Selected portions of the data can be communicated to surface receivers 28 by, e.g., mud pulse telemetry. Other logging-while drilling telemetry methods also exist and could be employed. For example, electromagnetic telemetry or through-wall acoustic telemetry can be employed with an optional repeater 30 to extend the telemetry range. Most telemetry systems also enable commands to be communicated from the surface to the control and telemetry module to configure the operation of the tools.

For mud pulse telemetry, telemetry module 26 modulates a resistance to drilling fluid flow to generate pressure pulses that propagate to the surface. One or more pressure transducers 28 convert the pressure signal into electrical signal(s) for sampling and digitization by a data acquisition system 36, which then communicates the digital data to a computer system 50 or some other form of a data processing device. Computer 50 operates in accordance with software (which may be stored on information storage media 52) and user input received via an input device 54 to process and decode the received signals. The resulting telemetry data may be further analyzed and processed by computer 50 to generate a display of useful information on a computer monitor 56 or some other form of a display device. For example, a driller could employ this system to measure fracturing-related properties of selected formations.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. The wireline logging tool 34 may have pads and/or centralizing springs to maintain the tool near the axis of the borehole as the tool is pulled uphole. As explained further below, tool 34 can include an NMR logging instrument that collects relaxation time distribution measurements and may further include a probe with an extendible isolation pad 38. A logging facility 44 collects measurements from the logging tool 34, and includes a computer system 45 for processing and storing the measurements gathered by the logging tool. Tubing-conveyed logging is similar to wireline logging, except that a tubing string is used to move the formation tester/NMR logging instrument through the borehole.

FIG. 3 shows a configuration of an illustrative formation testing/NMR logging tool 302 without its external shell. Tool 302 includes an arrangement of permanent magnets to provide an azimuthally-symmetric static field $B_0$ (shown in cross-section by contour lines 310). Two of the permanent magnets 304, 306 can be seen in FIG. 3. In the region 308 between the end magnets 304, 306 is some number of intermediate (reduced-diameter) magnets arranged with like poles together, i.e., north to north and south to south. Such an arrangement creates a relatively large sensing volume. Also within region 308 are one or more radio frequency antennas designed to provide a radio frequency magnetic field $B_1$ perpendicular to the static field $B_0$ and to detect the electromagnetic signature of the nuclei's precession. Permeable materials may be employed to enhance sensitivity of the antennas as well as for favorably shaping field lines. Such permeable materials would typically be positioned directly underneath the antennas. FIG. 3 also shows a probe 314 which can be an extendible isolation pad or a fracturing jet. In either case, the probe 314 can be designed to induce a formation fracture and to inject fluid into the formation generally in the direction of a sensing zone 312.

That portion of the static field $B_0$ having an appropriate strength for NMR measurements can be found within sensing zone 312. Some tools have a sensing zone that remains fixed relative to the tool. Such sensing zones can be symmetric to make the sensing region invariant with respect to tool rotation, or they can be asymmetric so that as the tool rotates, it obtains azimuthally-sensitive measurements. Even with a symmetric sensing zone, azimuthally-sensitive measurements can be obtained through the use of directionally-sensitive antennas. Variable sensing zones are used in tools designed for magnetic resonance imaging (MRI), which move or expand the sensing zone radially to obtain measurements as a function of three spatial dimensions. Such variation can be obtained by adjusting the static field, by adjusting the frequency of the radio frequency field, and/or by making signal measurements over a range of frequencies.

Radial axis 316 extends perpendicularly outward from the tool's longitudinal axis and in the initial flow direction of any injected fluids. FIG. 4 shows the strength of an illustrative static magnetic field along this axis, with the sensing zone 312 indicated in broken outline. For a larger sensing volume (and a higher signal-to-noise ratio), the magnetic field gradient in the sensing region is generally preferred to be small. For a higher spatial resolution, the magnetic field gradient in the sensing zone is generally preferred to be large. MRI tools often employ "high" gradient fields while fixed sensing zone tools often employ "low" gradient fields.

FIG. 5 shows two illustrative relaxation time distributions that might be measured by the NMR tool. Curve 502 shows a distribution representative of a typical formation while curve 504 shows a distribution representative of an injection fluid. The distribution for the injection fluid is skewed and suppressed, making it easily distinguishable from the typical formation. The distribution of the injection fluid can be customized to maximize its contrast relative to expected formation distributions.

When injected into a fracture, a pure water or hydrocarbon fluid with essentially no paramagnetic or ferromagnetic contaminants would be expected to have a strong peak far to the right, indicating a very long relaxation time constant. If the formation has low permeability, the tool can easily distinguish fluid in the fractures from fluid in the formation matrix. For reliable measurements in a porous formation, a contrast agent might be added to the injection fluid. Even at very low concentrations, paramagnetic, ferrimagnetic, and ferromagnetic materials have been shown to strongly reduce relaxation times and reduce the strength of the signal response (perhaps by shifting the relaxation times outside the detection limits of the tool).

In addition to selecting the materials and concentrations to customize the relaxation times of the injected fluids, the engineer can adjust the size and form of the contrast agent materials.

For example, the materials can be provided in the form of micrometer-scale nanoparticles to prevent the contrast agent from entering formation pores. This approach would further enhance the contrast between formation matrix fluids and formation fracture fluids. The time at which the contrast agent is injected can also be adjusted to further enhance the contrast. For example, the contrast agent may be omitted during the initial stages of fluid injection and formation fracturing, but then introduced into the flow stream at a later stage to limit the opportunity for the contrast agents to diffuse from the fractures to the formation matrix.

Most NMR measurements employ radio frequency fields designed to measure the relaxation times of hydrogen nuclei (i.e., protons), which are nearly ubiquitous. As an alternative approach to enhancing the contrast between the injection fluid and the formation, the tool's radio frequency fields can be re-tuned to measure the relaxation times of other nuclei such as, e.g., carbon-13 ($^{13}C$), that are relatively rare in nature. The injection fluid can be a $^{13}C$-enriched liquid hydrocarbon. In accordance with the teachings of Songhua Chen in U.S. Pat. App. Pub. 2009/0179636 "Method of discerning water from hydrocarbon fluids using downhole NMR instruments . . . ", the signal measurements may include an undesired hydrogen response which can be compensated through the use of multi-frequency measurements.

FIG. 6A shows a formation tester/NMR logging tool 602 in a borehole through a formation 604. A probe with an extendable isolation pad 606 is pressed against the borehole wall 604 to inject a fluid stream represented by arrow 608. FIG. 6A further shows a fracture 610 being opened by the injection fluid stream 608, the fluid (and the fracture) passing through the tool's sensing zone 612. The direction and orientation of the fractures will depend on various formation properties including the grain boundaries and stress field.

Figure 6B:
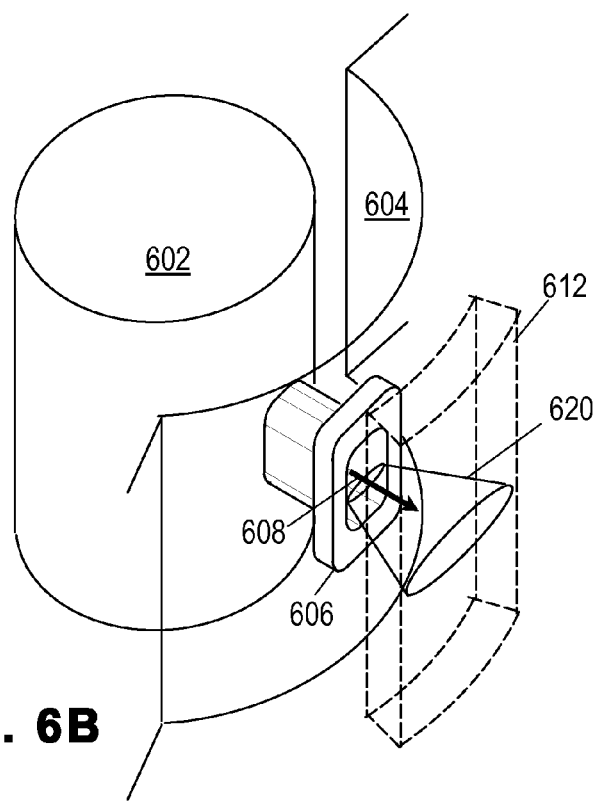
Figure 6C:
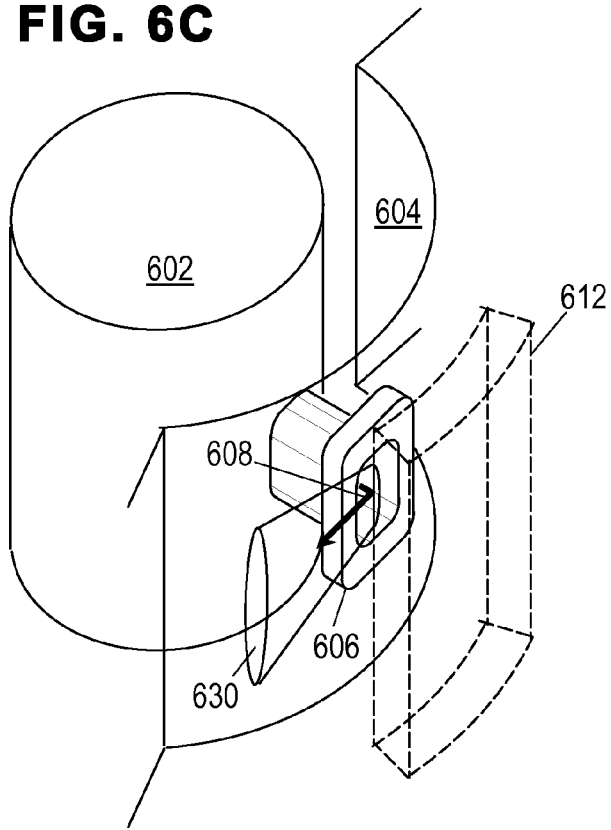

If the radial axis 316 (FIG. 3) is treated as the x-axis in a Cartesian coordinate system and the tool's longitudinal axis is treated as the z-axis, the fracture plane in FIG. 6A is substantially perpendicular to the y-axis. Such fracture orientations may be termed "longitudinal" and are often considered to be the most desirable fracture orientation. In FIG. 6B, the fluid flow opens a fracture 620 that is substantially perpendicular to the z-axis. Such fracture orientations may be termed "transverse". In FIG. 6C, fracture 630 is substantially perpendicular to the x-axis. Such fracture orientations may be termed "tangential". Tangential fractures generally divert the injection fluid flow from its desired path and may be regarded as undesirable. Each orientation has a different degree of intersection between the fracture and the sensing zone 612. (The tangential orientation in particular can entirely miss the sensing zone.) In practice, the fracture plane can have some intermediate orientation that is a combination of longitudinal, transverse, and tangential.

Figure 7:
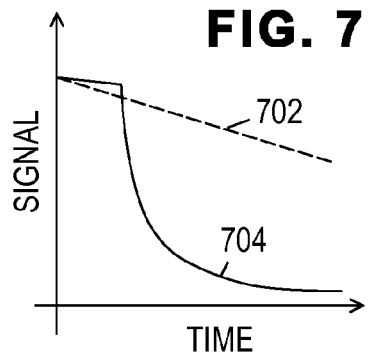
FIG. 7 shows an illustrative time dependence of an NMR signal.

FIG. 7 shows two illustrative curves for a NMR signal response strength versus time. The signal response strength can, in some embodiments, be calculated as an integral of the relaxation time distribution over a predetermined range of time constants. Curve 702 shows the signal strength over time for an unfractured formation that is penetrated by a diffusion mechanism of the injection fluid. On the other hand, curve 704 shows the signal strength over time for a formation that gets fractured by the injection fluid. The signal strength's sudden change in slope corresponds to the fracture formation and the ensuing gradual slope changes correspond to the rate at which the injection fluid increases the fracture volume.

The tool will also measure the pressure-versus-time curve for the injection fluid that is still in the borehole. This curve may serve as an indicator of fracture formation and expansion. The pressure-versus-time curve, together with a known or measured injection rate for the fluid, provides a first measure of fracture extent and volume. The NMR signal measurements provide a measure of fracture orientation and volume within the sensing zone. Orientation and volume can be estimated by correlating the NMR signal strength-versus-time with the pressure-versus-time curves to measure the relative size and propagation of the fracture in the sensing zone and the fracture as a whole. (Different fracture plane orientations are expected to yield different relative size estimates.) Alternatively fracture orientation and volume can be measured directly using MRI techniques.

Figure 8:
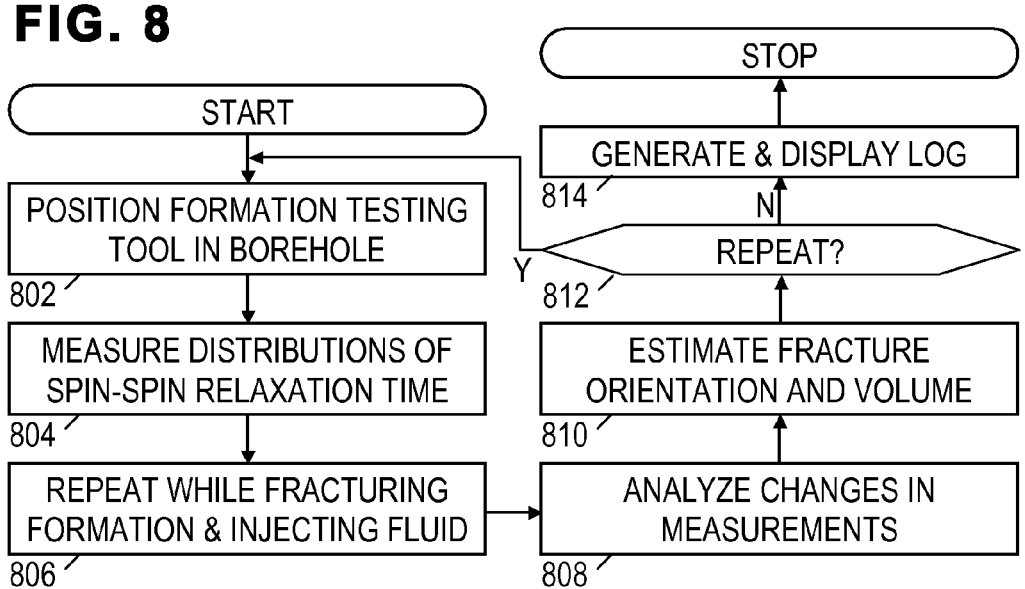
FIG. 8 is a flow diagram of an illustrative injected fluid tracking method.

FIG. 8 is a flow diagram for an illustrative injected fluid tracking method. In block 802, the operator positions the tool at a desired position in the borehole. In block 804, the operator performs an initial NMR measurement of the formation, e.g., obtaining a measure of the $T_2$ distribution. In block 806 the operator conducts a formation fracturing and fluid injection procedure, repeating the NMR measurements continuously during the procedure. In block 808, the operator analyzes the changes in the NMR measurements to verify that a fracture was successfully formed. In block 810, the operator estimates the volume and orientation of the fracture based at least in part on the NMR measurements, and at least in some embodiments, on the pressure versus time and the injection rate measurements. In block 812, the operator determines whether further tests are needed, and if so, blocks 802-812 are repeated. In block 814, the results are compiled into a log that is then displayed to the operator. The log may show various fracture-related parameters as a function of borehole position, the parameters possibly including fracture initiation pressure, fracture orientation, and fracture volume. Some or all of the operations represented in FIG. 8 can be performed with the assistance of software running in a processor in the downhole tool and/or software running in a processing system on the surface. Numerous variations, modifications and equivalents will become apparent to those skilled in the art once the above disclosure is fully appreciated. It is intended that the following claims be interpreted broadly to embrace all such variations, modifications, and equivalents.

What is claimed is:

1. A logging system that comprises:
   a logging tool that provides measurements indicative of nuclear magnetic resonance (NMR) signals in a sensing zone;
   a fluid injector that, during said measurements, injects a fluid to open a fracture in or proximate to the sensing zone; and
   a processor that determines, based at least in part on said measurements, NMR signal strength-versus-time values corresponding to different times during injection of the fluid, and wherein the processor determines a fracture volume based at least in part on the NMR signal strength-versus-time values.

2. The system of claim 1, wherein the processor further derives a fracture orientation based at least in part on the NMR signal strength-versus-time values.

3. The system of claim 1, wherein the logging tool collects magnetic resonance imaging (MRI) measurements.

4. The system of claim 1, wherein the logging tool measures one or more relaxation time distributions.

5. The system of claim 1, wherein the fluid includes an NMR contrast agent.

6. The system of claim 5, wherein the contrast agent includes paramagnetic, ferrimagnetic, or ferromagnetic materials to reduce a relaxation time of the fluid.

7. The system of claim 5, wherein the contrast agent includes nanoparticles that resist diffusion into a formation matrix.

8. The system of claim 5, wherein the contrast agent is only added to the fluid after the fracture has been opened.

9. The system of claim 5, wherein the contrast agent includes carbon-13 ($^{13}C$).

10. The system of claim 1, wherein the fluid injector comprises a fracturing jet.

11. The system of claim 1, wherein the fluid injector comprises an extendible isolation pad.

12. The system of claim 1, wherein the processor determines the fracture volume by correlating NMR signal strength-versus-time values with pressure-versus-time values.

13. The system of claim 1, wherein the processor identifies slope changes from the NMR signal strength-versus-time values, and wherein the processor associates different portions of the slope changes with fracture formation and increasing fracture volume.

14. A formation testing method that comprises:
injecting, by a fluid injector, a fluid into a formation to open a fracture through or near to a sensing zone;
collecting, by a downhole nuclear magnetic resonance (NMR) tool, NMR measurements from the sensing zone while injecting said fluid;
determining, by a processor, NMR signal strength-versus-time values corresponding to different times during injection of the fluid; and
determining, by the processor, an orientation of said fracture based at least in part on the NMR signal strength-versus-time values.

15. The method of claim 14, further comprising estimating a volume of said fracture based at least in part on said NMR signal strength-versus-time values.

16. The method of claim 15, further comprising displaying the fracture volume and orientation to a user.

17. The method of claim 14, further comprising adding a contrast agent to said fluid after the fracture has opened.

18. The method of claim 14, wherein said collecting includes adjusting the sensing zone to obtain NMR measurements as a function of at least azimuth and radial distance.

19. The method of claim 14, wherein said injecting includes inflating one or more packers to isolate a borehole region near the sensing zone.

20. The method of claim 14, wherein said injecting includes extending a probe to seat an isolation pad against a borehole wall near the sensing zone.

21. The method of claim 14, wherein determining the orientation comprises correlating NMR signal strength-versus-time values with pressure-versus-time values.

22. The method of claim 14, further comprising identifying slope changes from the NMR signal strength-versus-time values and associating different portions of the slope changes with fracture formation and increasing fracture volume.

* * * * *